United States Patent [19]

Nagase et al.

[11] Patent Number: 4,714,068
[45] Date of Patent: Dec. 22, 1987

[54] METHOD AND DEVICE FOR CONTROLLING FUEL INJECTION QUANTITY OF ELECTRONIC CONTROL DIESEL ENGINE

[75] Inventors: Masaomi Nagase, Toyota; Eiji Takemoto, Oobu; Noritaka Ibuki, Oogaki; Takashi Hasegawa, Tajimi, all of Japan

[73] Assignee: Toyota Jidosha Kabushiki Kaisha, Aichi, Japan

[21] Appl. No.: 868,097

[22] Filed: May 29, 1986

[51] Int. Cl.$^4$ ............................................. F02M 39/00
[52] U.S. Cl. .................................... 123/506; 123/357; 123/458
[58] Field of Search ............... 123/506, 503, 458, 494, 123/357-359, 500, 501; 73/119 A

[56] References Cited

U.S. PATENT DOCUMENTS

| | | | |
|---|---|---|---|
| 4,395,987 | 8/1983 | Kobayashi | 123/506 |
| 4,562,810 | 1/1986 | Miyari | 123/506 |
| 4,563,992 | 1/1986 | Kobayashi | 123/458 |
| 4,574,756 | 3/1986 | Ito et al. | |
| 4,579,096 | 4/1986 | Kobayashi | 123/458 |
| 4,596,949 | 10/1985 | Igashira | 123/506 |

Primary Examiner—Carl Stuart Miller
Attorney, Agent, or Firm—Parkhurst & Oliff

[57] ABSTRACT

In controlling a fuel injection quantity by an electromagnetic spill valve on-off operated at a target spill angle in accordance with an angle count number and a time count number of an engine rotation, based on the engine rotation angle signal outputted through a predetermined crank angle, the angle count number is set at a predetermined value during idling and time count is constantly started from one and the same point of on-off operate the electromagnetic spill valve. In consequence, the control of the fuel injection quantity does not fluctuate during idling irrespective of various factors of dispersion. On the other hand, during non-idling, the angle count number varying in association with the target spill angle is determined and the time count is started from the end point of the angle count number to control the electromagnetic spill valve. In consequence, an adverse influence suh as an engine stall is not rendered to the normal operating conditions.

10 Claims, 9 Drawing Figures

METHOD AND DEVICE FOR CONTROLLING FUEL INJECTION QUANTITY OF ELECTRONIC CONTROL DIESEL ENGINE

BACKGROUND OF THE INVENTION

1. Field of the Invention

This invention relates to a method and a device for controlling the fuel injection quantity of an electronic control diesel engine, and more particularly to improvements in a method and a device for controlling fuel injection quantity, being suitable for use in a diesel engine provided with an electromagnetic spill type fuel injection pump, wherein a fuel injection quantity is controlled by an electromagnetic spill valve on-off operated at a target spill angle in accordance with an angle count number and a time count number of an engine rotation angle signal, based on the engine rotation angle signal outputted through a predetermined crank angle.

2. Description of the Prior Art

Along with the development in the electronic control techniques, particularly, the digital control techniques in recent years, there has been commercialized the so-called electronic control diesel engine, wherein a fuel injection pump of the diesel engine is electronically controlled.

There are various methods of electronically controlling the fuel injection pump. One of the fuel injection pumps is a so-called electromagnetic spill fuel injection pump as disclosed in U.S. Pat. No. 4,520,780 for example, wherein fuel spill in the fuel injection pump is controlled by an electromagnetic spill valve. In this electromagnetic spill type fuel injection pump, at a spill timing where the fuel injection quantity reaches a target value, a spill port is opened by an electromagnetic spill valve to control the termination of fuel injection, so that the fuel injection quantity is controlled.

Figure 7:
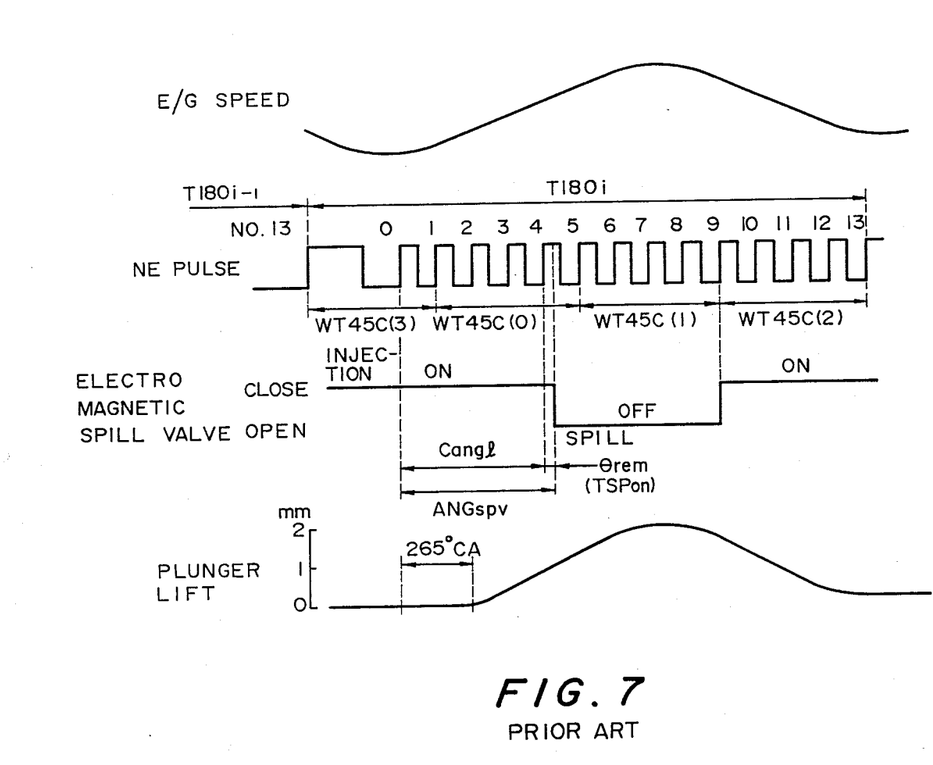
FIG. 7 is a chart showing the relationship between the engine speed, the engine rotation pulses, the on-off conditions of the electromagnetic spill valve and the plunger lift in the conventional example.

Normally, the electromagnetic spill valve is on-off operated by a control unit for taking in a detection signal from an engine rotation sensor (NE sensor) for detecting an engine rotation angle and an engine speed, including a rotation angle gear wheel fixed to a driving shaft of the fuel injection pump, and an electromagnetic pickup provided on a roller ring, for detecting a gear of the rotation angle gear wheel, and for a calculating and determining a fuel injection quantity as referenced from a rotation angle signal. More specifically, the roller ring moves in accordance with the position of a timer piston, whereby a pressure feed timing of a plunger is varied to change the injection timing. Since the roller ring and a plunger lift are associated in positional relationship with each other at a rate of 1:1, an engine rotation pulse (NE pulse) and a plunger lift are associated with each other at the rate of 1:1 as shown in FIG. 7.

The electromagnetic spill valve is of a normally open type, energized as referenced from the NE pulse position, turned on (fuel injection) at No. 9 pulse before the pressure feed of the plunger, and turned off (injection cut by the spill) at a spill angle ANGspv, where a target fuel injection quantity is obtained.

More specifically, upon a lapse of a time duration (time count number) TSPon corresponding to a time count angle $\theta$rem (°CA) as referenced from an end point of an angle count number Cangl of the engine rotation angle signal, the electromagnetic spill valve is turned off. The time conversion of the time count angle $\theta$rem to the time duration TSPon is determined from a preceding engine rotation time duration $T180_{i-1}$ through 180° CA for example.

However, the time count angle $\theta$rem may have a large dispersion due to factors such as the dispersion of fuel injection quantities of a fuel injection nozzle and the fuel injection pump, the change with time (the spill angle ANGspv varies so as to be a target rotation due to idle speed control), the press-in dispersion of the rotation angle gear wheel, the variations in the fuel injection quantity due to an automatic transmission, an air conditioner, a power steering unit, electric loads, etc., the change in the fuel injection quantity due to the fuel temperature and nature, and the like, whereby the angle count number Cangl as being the reference may vary. To prevent the delay due to the multiple interrupts such as the interrupt of the NE sensor, ignition interrupt, 5 millisecond interrupt, interrupt of analogue-digital conversion when the angle count number Cangl varies as described above, the spill time duration TSPon corresponding to the time count angle $\theta$rem is determined from the preceding NE pulse rising position as shown in FIG. 8(A) when it is within the set time duration, e.g. 220 microseconds from the NE pulse rising position. While, it is 220 microseconds or more from the NE pulse rising position, it is conceivable that the spill time duration TSPon is left as it is as shown in FIG. 8(B). However, according to the method of this type, when the NE pulse rising as being the reference is changed over, a dispersion of 220 microseconds (0.9° CA, which corresponds to the fuel injection quantity 3 mm³/stroke at the time of idling).

In consequence, due to the dispersion factor of the aforesaid time count angle $\theta$rem (TSPon), the timing of turning off the electromagnetic spill valve suffers from a great dispersion of the fuel injection quantity just at the time of change-over of the NE pulse, particularly, in the proximity of the idling including a low rotation area, thus presenting a problem of that the vibrations of the engine become very high.

Figure 8:
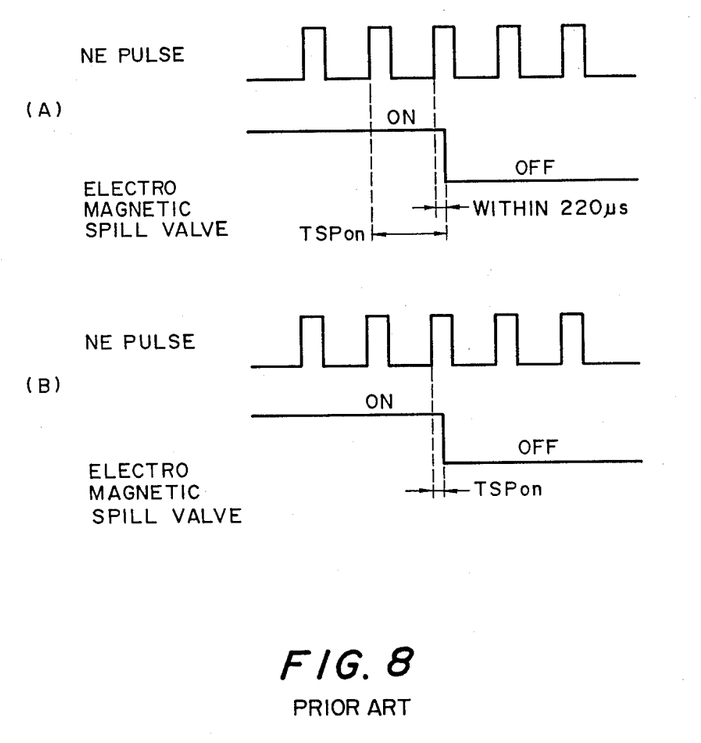
FIGS. 8(A) and 8(B) shown the relationship between the engine rotation pulses and the on-off conditions of the electromagnetic spill valve in the conventional example, when the time count number of the spill angle is less than 220 microseconds and 220 microseconds or more, respectively.

In FIGS. 7 and 8, the NE pulses are shown equidistantly, however, when the engine rotates practically, intervals in the proximity of No. 0 pulse is wide (the engine speed is low) and the intervals in the proximity of No. 8 pulse are narrow (the engine speed is high). Moreover, as the engine speed momentarily varies even within the intervals of the NE pulses, the association of the time duration with the angle is not at the rate of 1:1. In consequence, the engine rotation time duration through 11.25° CA is not equal to 1/16 (AVT45/4) of the preceding engine rotation time duration through 180° CA, whereby, at the change-over point of the reference position of the NE pulse, there is a considerable difference between the spill valve off timing calculated from No. 5 pulse and one calculated from No. 6 pulse for example. As the result, at the change-over point of the reference position of the NE pulse, the dispersion of the fuel injection quantity control due to the dispersion of the spill valve off timing is increased.

This tendency is the largest in the proximity of idling. At high speed rotation, the fluctuations in rotation due to the compression and explosion of the engine is decreased, whereby it becomes negligible.

Additionally, as the methods of raising the detecting accuracy in detecting the rotation angle, there have been proposed that the tooth number of the rotation angle gear wheel is increased, and a multiplicity of magnetic poles different in polarity are provided on a circumference, which are adjacent to one another, as proposed by one of the applicants in Japanese Patent Application No. 104949/1984. Any way, the dispersion of the fuel injection quantity due to the dispersion of the angle count number cannot be efficiently prevented.

SUMMARY OF THE INVENTION

The present invention has been developed to obviate the above-described disadvantages of the prior art and has as its object the provision of a method and a device for controlling the fuel injection quantity of an electronic control diesel engine, wherein the dispersion of the fuel injection quantity due to the dispersion of an angle count number in the idling conditions can be prevented, so that vibrations of the engine and fluctuations in the rotation can be reduced.

Figure 1:
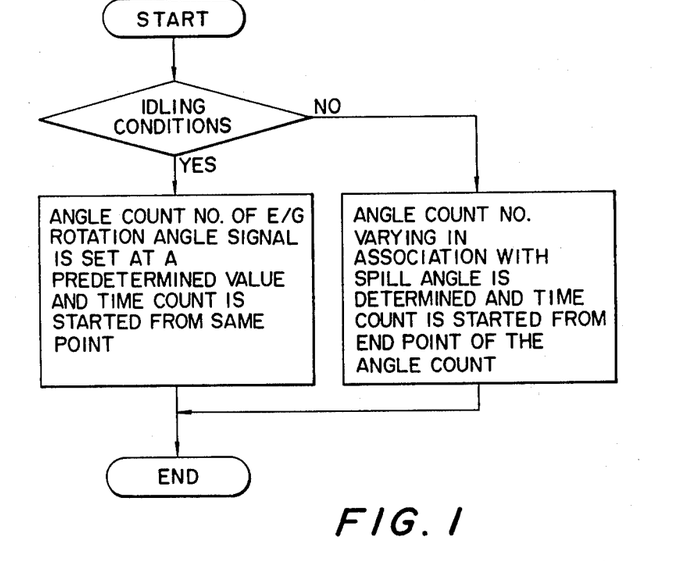
FIG. 1 is a flow chart showing the technical gist of the method of controlling the fuel injection quantity of an electronic control diesel engine according to the present invention.

To achieve the above-described object, the present invention contemplates that, in a method of controlling a fuel injection quantity of an electronic control diesel engine, wherein, the fuel injection quantity is controlled by an electromagnetic spill valve on-off operated at a target spill angle in accordance with an angle count number and a time count number of an engine rotation angle signal, based on the engine rotation angle signal outputted through a predetermined crank angle, as the technical gist is shown in FIG. 1, the method comprises:
a step of detecting whether the idling conditions exist or not;
a step of setting the angle count number of the engine rotation angle signal at a prdetermined value during idling and constantly starting a time count from one and the same point to on-off operate the electromagnetic spill valve; and
a step of determining the angle count number varying in association with the target spill angle during non-idling and starting the time count from the end point of the angle count number to on-off operate the electromagnetic spill valve.

A specific form of the present invention is of such an arrangement that the idling conditions are made to be stabilized idling conditions and the vibrations of the engine and the fluctuations in rotation, which pose great problems, during stabilized idling can be efficiently reduced.

Another specific form of the present invention is of such an arrangement that the idling conditions are brought into the proximity of the idling area and the low rotation area, so that the vibrations of the engine and the fluctuations in rotation can be reduced not only in the stabilized idling conditions but also in a wide range in the proximity of the idling area.

A further specific form of the present invention is of such an arrangement that, in determining the angle count number varying in association with the target spill angle, correction of a surplus time duration in consideration of the multiple interrupts is performed, so that a precise fuel injection quantity control can be performed irrespective of the multiple interrupts.

According to the present invention, in controlling the fuel injection quantity by the electromagnetic spill valve on-off operated at a target spill angle in accordance with the angle count number and the time count number of the engine rotation, based on the engine rotation angle signal outputted through the predetermined crank angle, the angle count number of the engine rotation angle signal is set at a predetermined value during idling and the time count is constantly started from one and the same point to on-off operate the electromagnetic spill valve. In consequence, during idling, the angle count number as being the reference is not changed irrespective of the factors of various dispersions, so that the fuel injection quantity control will not be dispersed. In consequence, the fuel injection quantity in the idling conditions can be conducted exactly, and the vibrations of the engine and the fluctuations in rotation can be reduced. On the other hand, during non-idling, the angle count number varying in association with the target spill angle is determined in the same manner as in the conventional method, the time count is started from the end point of the angle count number to on-off operate the electromagnetic spill valve. In consequence, an adverse influence such as an engine stall and the like caused by constantly fixing the angle count number at a predetermined value will not be rendered to the normal operating conditions.

BRIEF DESCRIPTION OF THE DRAWINGS

The exact nature of the invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the electronic control diesel engine for a motor vehicle, to which is applied the method of controlling the fuel injection quantity according to the present invention with reference to the accompanying drawings.

Figure 2:
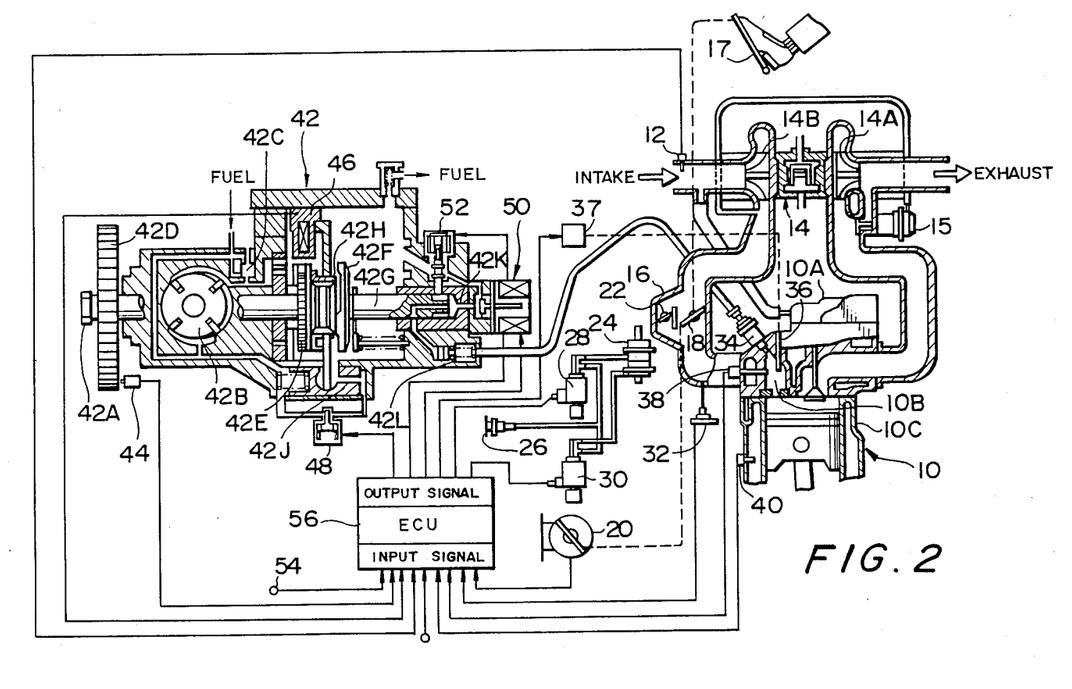
FIG. 2 is a sectional view, partly including a block diagram, showing the general arrangement of one embodiment of the electronic control diesel engine for a motor vehicle, to which is applied the present invention.

FIG. 2 shows an embodiment of the present invention in which an intake-air temperature sensor 12 for detecting intake-air temperature is provided at the downstream side of an air cleaner, now shown. Provided at the downstream side of the intake-air temperature sensor 12 is a turbo charger 14 including a turbine 14A rotatable by heat energy of the exhaust gas and compressor 14B rotatable in operational association with this turbine 14A. The upstream side of the turbine 14A of the turbocharger 14 and the downstream side of the compressor 14B communicate with each other through a waste gate valve 15 to prevent intake-air pressure from being raised excessively high.

Provided in a venturi 16 disposed at the downstream side of the compressor 14B is a main intake-air throttle valve 18 rotatable non-linearly in operational association with an accelerator pedal 17, so as to restrict an intake-air quantity during idling and the like. The opening angle Accp of the accelerator pedal 17 (hereinafter referred to as an "accelerator opening") is detected by an accelerator position sensor 20.

Provided in parallel to the main intake-air throttle valve 18 is an auxiliary intake-air throttle valve 22, the opening of which is controlled by a diaphragm device 24. Supplied to the diaphragm device 24 is a vacuum generated in a vacuum pump 26 through a vacuum switching valve (hereinafter referred to as a "VSV") 28 or 30.

Provided at the downstream side of the intake-air throttle valves 18 and 22 is an intake pressure sensor 32 for detecting intake-air pressure.

A cylinder head 10A of a diesel engine 10 is provided with an injection nozzle 34, a glow plug 36 and an ignition timing sensor 38, the forward ends of which are located in an engine combustion chamber 10B. Furthermore, provided on a cylinder block 10C of the diesel engine 10 is a water temperature sensor 40 for detecting the temperature of engine cooling water.

Glow current is supplied to the glow plug 36 through a glow relay 37.

Fuel is fed under pressure to the injection nozzle 34 from an injection pump 42. The injection pump 42 includes a driving shaft 42A rotatable in operational association with the rotation of a crankshaft of the diesel engine 10; a feed pump 42B (FIG. 2 shows a state in which the pump is developed through 90°) secured to the driving shaft 42a to pressurize the fuel; a fuel pressure regulating valve 42C for regulating fuel feed pressure; a reference position sensor 44 such as an electromagnetic pickup for detecting a reference position such as top dead center (TDC) from a displacement in rotation of a gear wheel 42D secured to the driving shaft 42A; and NE sensor 46 such as an electromagnetic pickup for detecting an engine speed from a displacement in rotation of a gear wheel 42E (rotating angle gear wheel) secured to the driving shaft 42A; a roller ring 42H for reciprocating a face cam 42F and a plunger 42G and varying the timing thereof; a timer piston 42J (FIG. 2 shows a state in which the timer piston is developed through 90°) to vary a rotary position of the roller ring 42H; a timing control valve (hereinafter referred to as a "TCV") 48 for controlling the position of the timer piston 42J to control the injection timing; an electromagnetic spill valve 50 for varying fuel relief timing from the plunger 42G through a spill port 42K to control the fuel injection quantity; a fuel cut valve 52 for cutting the fuel when abnormality occurs; and a delivery valve 42L for preventing back flow and after-dripping of the fuel.

Figure 3:
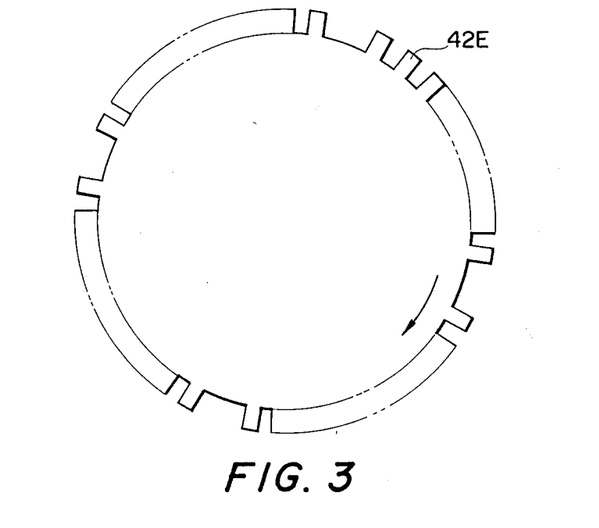
FIG. 3 is a plan view showing the rotation angle gear wheel used in the above embodiment.

The gear wheel 42E has a shape in plan view as shown in FIG. 3 for example.

Outputs from the intake-air temperature sensor 12, the accelerator position sensor 20, the intake pressure sensor 32, the ignition timing sensor 38, the water temperature sensor 40, the reference position sensor 44, the NE sensor 46, a glow current sensor 54 for detecting a glow current flowing through the glow plug 36, a key switch, an air conditioner switch, a neutral safety switch and a vehicle speed signal are inputted to and processed in an electronic control unit (hereinafter referred to as an "ECU") 56. The VSV 28, 30, the glow relay 37, the TCV 48, the electromagnetic spill valve 50 and the fuel cut valve 52 are controlled by outputs from the ECU 56.

Figure 4:
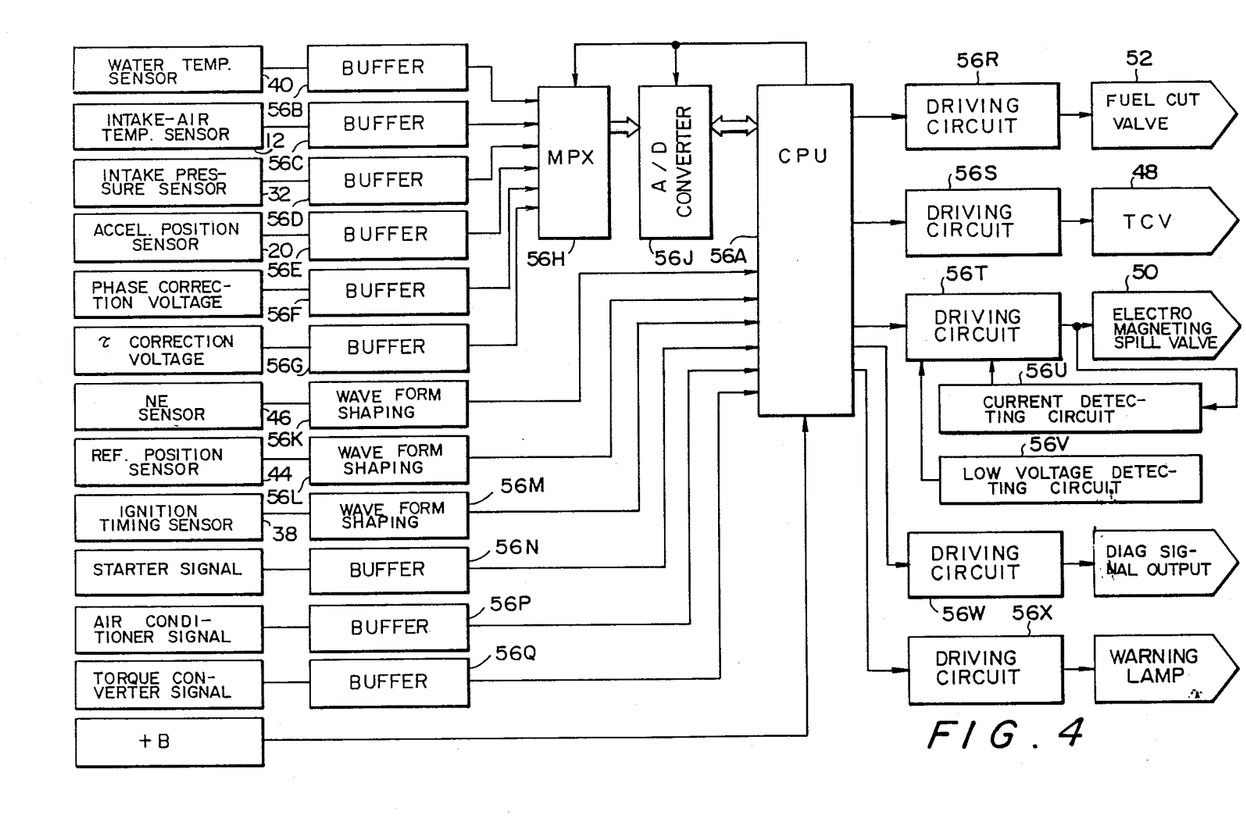
FIG. 4 is a block diagram showing the arrangement of the electronic control unit used in the above embodiment.

As shown in FIG. 4, the ECU 56 includes: a central processing unit (hereinafter referred to as a "CPU") 56A for performing various calculation processing; a multiplexer (hereinafter referred to as an "MPX") 56H for succesively taking in an output from the water temperature sensor 40, which is inputted through a buffer 56B, an output from the intake air temperature sensor 12, which is inputted through a buffer 56C, an output from the intake pressure sensor 32, which is inputted through a buffer 56D, an output from the accelerator position sensor 20, which is inputted through a buffer 56E, a phase correction voltage signal inputted through a buffer 56F and a tau correction voltage signal inputted through a buffer 56G; an analog-digital converter (herinafter referred to as an "A/D converter") 56J for converting analog signals outputted from the MPX 56H into digital signals and inputting the same into the CPU 56A; a wave form shaping circuit 56K for wave form shaping an output from the NE sensor 46 and inputting the same into the CPU 56A; a wave form shaping circuit 56L for wave form shaping an output from the reference position sensor 44 and inputting the same into the CPU 56A; a wave form shaping circuit 56M for wave form shaping an output from the ignition timing sensor 38 and inputting the same into the CPU 56A; a buffer 56N for inputting a starter signal into the CPU 56A; a buffer 56P for inputting an air conditioner signal into the CPU 56A; a buffer 56Q for inputting a torque converter signal into the CPU 56A; a driving circuit 56R for driving the fuel cut valve 52 in accordance with the result of calculations by the CPU 56A; a driving circuit 56S for driving the TCV 48 in accordance with the result of calculations by the CPU 56A; a driving circuit 56T for driving the electromagnetic spill valve 50 in accordance with the result of calculations by the CPU 56A; a current detecting circuit 56U for detecting a current flowing through the electromagnetic spill valve 50 and feeding-back the same to the driving circuit 56T; a low voltage detecting circuit 56V for detecting a low voltage and inputting the same into the driving circuit 56T; a driving circuit 56W for outputting a self diagnosis signal (hereinafter referred to as a "diag signal") in accordance with the result of calculations by the CPU 56A; and a driving circuit 56X for driving a warning lamp in accordance with the result of calculations by the CPU 56A.

The aforesaid phase correction voltage signal is the signal for correcting a phase difference occuring when the reference position sensor 44 is mounted to the injection pump 42. Furthermore, the aforesaid tau correction voltage signal is the signal for correcting a deviation in responsiveness due to differences between individual parts in the injection pump 42.

Description will hereunder be given of action of one embodiment.

Figure 5:
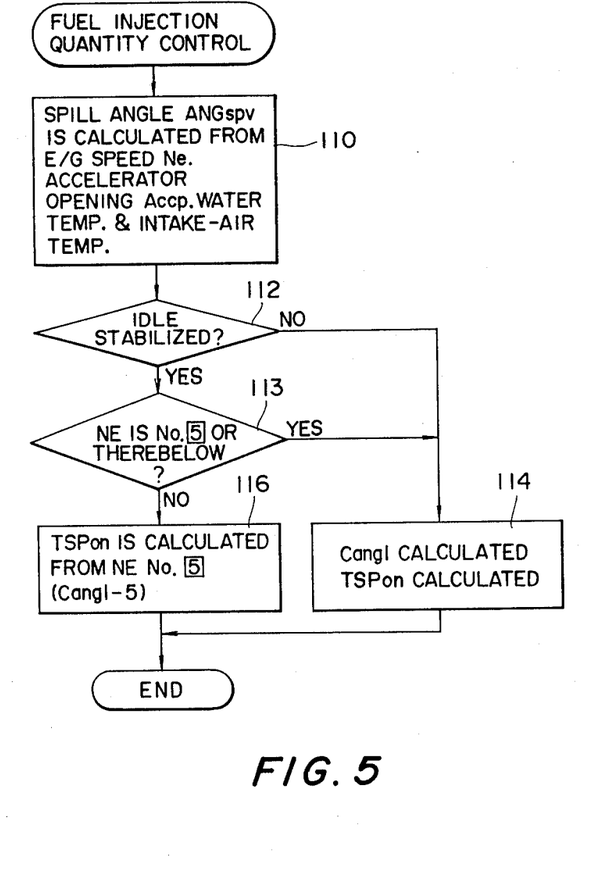
FIG. 5 is a flow chart showing the routine for calculating the spill angle used in the above embodiment.

In the preferred embodiment, the injection quantity control is carried out in accordance with the flow chart shown in FIG. 5. More specifically, firstly, in Step 110, the spill angle ANGspv is calculated from the engine speed NE detected from outputs of the NE sensor 46, the accelerator opening Accp detected from an output of the accelerator position sensor 20, engine cooling water temperature detected from an output of the water temperature sensor 40, intake-air temperature detected from an output of the intake-air temperature sensor 12 and so on. Subsequently, the routine proceeds to Step 112, where it is judged whether the stabilized idling conditions exist or not from the establishment of all of the conditions including that it is not during the start and during some period of time after the start, that some period of time has elapsed after an accelerator pedal 17 is fully closed, that a neutral range is adopted or the vehicle speed is zero in a drive range, that a dash pot is not acting, and the like. When the result of the judgment is positive, the routine proceeds to Step 113, where judgment is made whether the NE pulse is No. 5 pulse or therebelow or not.

When the result of the judgment in Step 112 is negative and it is judged that the operating conditions are normal, or the result of the judgment in Step 113 is positive and it is judged that the count should be made from No. 4 pulse, the routine proceeds to Step 114, where the reference position Cangl of the NE pulse, which is associated with the spill angle ANGspv, is calculated in the same manner as in the conventional manner, and the time duration TSPon referenced from the Cangl is calculated.

More specifically, as shown in the following formula, the spill angle ANGspv is divided by the angle of one tooth bearing of the NE sensor 46, e.g. 11.25° CA, whereby the angle count number Cangl is calculated.

$$\text{ANGspv}/11.25 \rightarrow \text{Cangl} + \text{surplus} \qquad (1)$$

Subsequently, this surplus of the result of calculation is timewisely converted to the time duration (time count number) TSPon of the spill angle by use of the engine rotation time duration AVT45 (=T180/4) through 45° CA calculated from the time duration T180 from the preceding reference position, i.e. the lacked tooth position as shown in the following formula.

$$\text{Surplus} \times \text{AVT45}/4 \rightarrow \text{TSPon} \qquad (2)$$

Additionally, in this Step 114, a surplus time duration of 220 microseconds is held in consideration of the multiple interrupts, whereby the angle count number Cangl and the time duration TSPon are corrected.

Upon completion of Step 114, the process goes out of this routine.

On the other hand, when the result of the judgment in Step 113 is negative, i.e. the idling conditions are stabilized and it is judged that the NE pulse is not No. 5 pulse or therebelow, the routine proceeds to Step 116, where the angle count number Cangl is fixed to a predetermined value, e.g. No. 5, and the time duration TSPon is constantly calculated from the end point of five angle count numbers, i.e. the rising of No. 5 pulse, thereafter, the process goes out of this routine.

Figure 6:
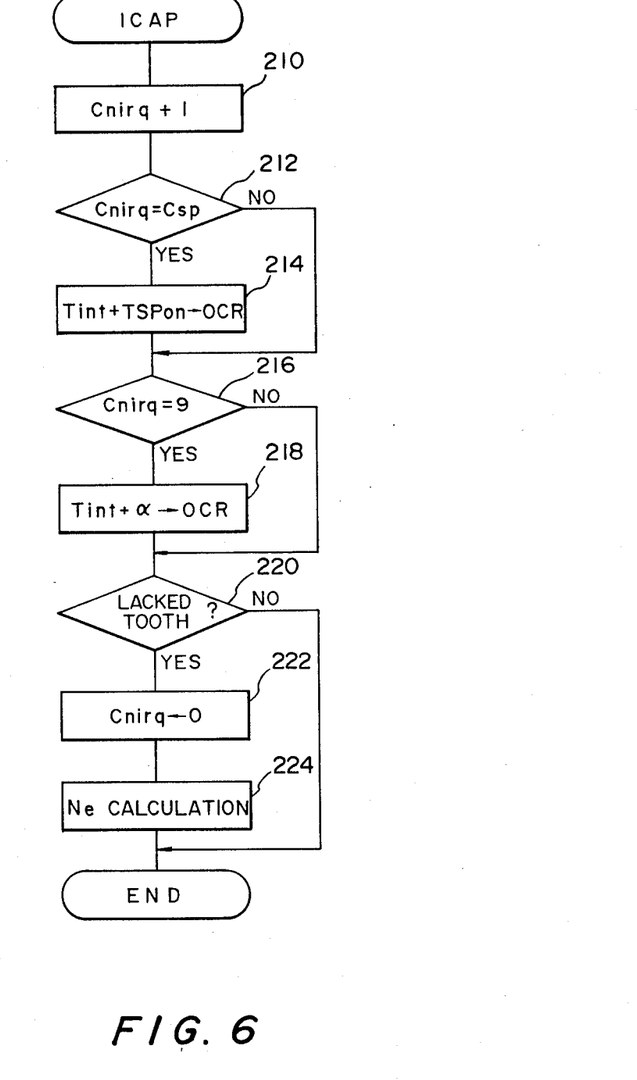
FIG. 6 is a flow chart showing an engine rotation pulse input capture routine for processing an output from the engine rotation sensor used in the above embodiment.

On the other hand, processing in association with the NE pulse inputted from the NE sensor 46 through the wave form shaping circuit 56K is carried out in accordance with an input capture (ICAP) routine as shown in FIG. 6. More specifically, the routine proceeds to Step 210 each time an input is inputted from the NE sensor 46, whereby the engine rotation interrupt counter Cnirq is incremented. Subsequently, the routine proceeds to Step 212, where judgement is made as to whether the count value of the counter Cnirq equals the angle count number Cangl determined in Step 114 or 116 or not. In short, the judgment in Step 212 is to determine whether there is a spill timing before the succeeding engine rotation interrupt or not.

When the result of the judgment in Step 212 is positive and it is judged that there is the spill timing, the routine proceeds to Step 214, where a value obtained by adding the time count number TSPon calculated in Step 114 or 116 to the interrupt time Tint of this time is inputted to an output compare register OCR to prepare the spill.

Upon completion of the process in Step 214 or when the result of the judgment in Step 212 is negative, the routine proceeds to Step 216, wherein judgment is made as to whether the count number of the counter Cnirq is set at a preset value for closing the electromagnetic spill valve 50 to prepare for the succeeding on-operation, e.g. 9 or not. When the result of the judgment is positive, i.e. it is judged that it is the time to close the electromagnetic spill valve 50, the routine proceeds to Step 218, where, as shown in the following formula, a value obtained by adding a surplus time duration Ts for interrupt calculation to the interrupt time Tint of this time is inputted to the output compare register OCR to prepase for closing the electromagnetic spill valve 50.

$$\text{Tint} + \text{Ts} \rightarrow \text{OCR} \qquad (3)$$

Upon completion of Step 218 or when the result of the judgment in Step 216 is negative, the routine proceeds to Step 220, where judgment is made as to whether it is the lacked tooth position in association with the reference position or not. When the result of the judgment is positive and judgment is made that it is the reference position, the routine proceeds to Step 222, where the counter Cnirq is cleared and, the routine proceeds to Step 224, where the engine speed Ne is calculated by use of the time duration T180 from the preceding lacked tooth position.

Upon completion of Step 224 or when the result of the judgment in Step 220 is negative, this input capture routine terminates.

Not shown though, when the time reaches the time preset in the output compare register OCR, the electromagnetic spill valve 50 is on-off operated.

In this embodiment, the idling conditions are made to be only the stabilized idling conditions, whereby the control according to the present invention is performed efficiently and for the least extent of necessity, and an adverse influence such as engine stall is not rendered to other areas. Additionally, the idling conditions under study according to the present invention need not necessarily be limited to the stabilized idling conditions, and the normal idling conditions may be adopted, or, for example, when the accelerator opening Accp is less than 4%, the engine speed is less than 1000 rpm and the spill angle ANGspv is located between No. 4 and No. 6 of the NE pulses, the spill angle is fixed to No. 4 and the control is performed by the time count number TSPon therefrom, whereby the control may be performed in the proximity of the idling area. In this case, the vibrations of the engine and the fluctuations in rotation can be reduced over a wider range.

What is claimed is:

1. A method of controlling a fuel injection quantity in an electronic control diesel engine, wherein said fuel injection quantity is controlled by an electromagnetic spill valve on-off operated at a target spill angle in accordance with an angle count number and a time count number of an engine rotation, based on an engine rotation angle signal outputted through a predetermined crank angle, comprising the steps of:
    detecting whether idling conditions exist or not;
    setting said angle count number of said engine rotation angle signal at a predetermined fixed value during detected idling conditions and starting a time count of said time count number from the end point of said predetermined fixed angle count number to on-off operate said electromagnetic spill valve; and
    determining said angle count number varying in association with said target spill angle during detected non-idling conditions and starting said time count of said time count number from the end point of said angle count number to on-off operate said electromagnetic spill valve.

2. A method of controlling a fuel injection quantity as set forth in claim 1, wherein said spill angle is calculated from at least an engine speed, an accelerator opening, engine cooling water temperature and intake-air temperature.

3. A method of controlling a fuel injection quantity as set forth in claim 1, wherein said detected idling conditions are made to be stabilized idling conditions.

4. A method of controlling a fuel injection quantity as set forth in claim 3, wherein said stabilized idling conditions are judged from the detection of conditions including: that it is not during the start or during some period of time after the start, that some period of time has elapsed after an accelerator pedal is fully closed, that a neutral range is adopted or the vehicle speed is zero in a drive range, and that a dash pot is not acting.

5. A method of controlling a fuel injection quantity as set forth in claim 1, wherein said detected idling conditions include an idling state and a low rotation non-idling state.

6. A method of controlling a fuel injection quantity as set forth in claim 1, wherein said fixing of said angle count number is performed only when said angle count number associated with said target spill angle is at a preset value or more.

7. A method of controlling a fuel injection quantity as set forth in claim 1, wherein, in determining said angle count number varying in association with said target spill angle, a surplus time duration is corrected in consideration of multiple interrupts.

8. A device for controlling a fuel injection quantity in an electronic control diesel engine, wherein said fuel injection quantity is controlled by an electromagnetic spill valve on-off operated at a target spill angle in accordance with an angle count number and a time count number of an engine rotation, based on an engine rotation angle signal outputted through a predetermined crank angle, comprising:
    means for detecting whether idling conditions exist or not;
    means for setting said angle count number of said engine rotation angle signal at a predetermined fixed value during detected idling conditions and for starting a time count of said time count number from the end point of said predetermined angle count number to on-off operate said electromagnetic spill valve during said detected idling conditions; and
    means for determining said angle count number varying in association with said target spill angle during the detected non-idling conditions and for starting said time count of said time count number from the end point of said angle count number to on-off operate said electromagnetic spill valve during detected non-idling conditions.

9. A method of controlling a fuel injection quantity as set forth in claim 1, wherein:
    during said detected idling conditions, a predetermined integer is fixed as said angle count number, a unit rotational angle is multiplied by the predetermined integer, the value obtained by the multiplication is subtracted from said target spill angle and the value obtained by the subtraction is used to determine said time count number to be time counted;
    and during said detected non-idling conditions, said target spill angle is divided by said unit rotational angle, the integer value obtained by the division being set as the angle count number and the fractional remainder resulting from the division being used to determine the time count number to the time counted.

10. A device for controlling a fuel injection quantity in an electronic control diesel engine as set forth in claim 8, wherein said fixed predetermined value of the angle count number during detected idling conditions is a fixed integer value and said angle count number during the detected non-idling conditions is the integer value obtained by division of the target spill angle by a unit rotational value, said device further comprising:
    means for multiplying said fixed integer value by said unit rotational angle, subtracting the value obtained by said multiplication from said target spill angle and for determining said time count number based upon the value obtained from said subtraction, during said detected idling conditions; and
    means for determining said time count number based upon the fractional remainder obtained by the division of the target spill angle by said unit rotational value, during said detected non-idling conditions.

* * * * *

UNITED STATES PATENT AND TRADEMARK OFFICE
CERTIFICATE OF CORRECTION

PATENT NO. : 4,714,068

DATED : December 22, 1987

INVENTOR(S) : Masaomi Nagase et al

It is certified that error appears in the above-identified patent and that said Letters Patent is hereby corrected as shown below:

Title page:

Please insert --Nippondenso Co., Ltd., Aichi, Japan-- as an asignee on the face of the patent.

Signed and Sealed this

Ninth Day of August, 1988

Attest:

DONALD J. QUIGG

*Attesting Officer*  *Commissioner of Patents and Trademarks*